United States Patent
Durand

(10) Patent No.: US 8,480,149 B2
(45) Date of Patent: Jul. 9, 2013

(54) HITCH ATTACHED EXTENSION FOR OVER SIZED CARGO

(75) Inventor: Denis Durand, St-Ursule (CA)

(73) Assignee: 9269-1096 Quebec Inc., Sainte-Ursule, QC (CA)

( * ) Notice: Subject to any disclaimer, the term of this patent is extended or adjusted under 35 U.S.C. 154(b) by 56 days.

(21) Appl. No.: 13/022,344

(22) Filed: Feb. 7, 2011

(65) Prior Publication Data

US 2011/0193319 A1   Aug. 11, 2011

(30) Foreign Application Priority Data

Feb. 9, 2010   (GB) .................................. 1002103.8

(51) Int. Cl.
*B62D 33/08*   (2006.01)

(52) U.S. Cl.
USPC ..................... 296/26.1; 296/26.08; 296/26.09

(58) Field of Classification Search
USPC .... 296/26.08, 26.09, 26.1, 26.11, 3; 224/511, 224/512, 518, 519, 522, 523, 524, 525, 529, 224/531, 532, 533; 280/491.1; 410/2, 3, 7
See application file for complete search history.

(56) References Cited

U.S. PATENT DOCUMENTS

| 2,852,303 | A | * | 9/1958 | Hopson | 296/26.09 |
| 5,451,088 | A | * | 9/1995 | Broad | 296/26.08 |
| 5,458,389 | A | * | 10/1995 | Young | 296/26.08 |
| 5,615,813 | A | * | 4/1997 | Ouellette | 224/405 |
| 5,649,656 | A | | 7/1997 | Sheldon | |
| 5,678,743 | A | | 10/1997 | Johnson et al. | |
| 5,699,985 | A | | 12/1997 | Vogel | |
| 5,752,636 | A | * | 5/1998 | Manley | 224/405 |
| 5,938,092 | A | | 8/1999 | Johnson | |
| 6,050,627 | A | | 4/2000 | Lee | |
| 6,070,926 | A | * | 6/2000 | Hardin | 296/26.08 |
| 6,129,371 | A | * | 10/2000 | Powell | 280/461.1 |
| 6,994,362 | B2 | * | 2/2006 | Foster | 280/163 |
| 7,243,966 | B1 | | 7/2007 | Sheldon | |
| 7,914,060 | B2 | * | 3/2011 | Scribner et al. | 296/26.08 |
| 2004/0245795 | A1 | | 12/2004 | Hansen | |
| 2007/0108246 | A1 | * | 5/2007 | Jennings et al. | 224/521 |
| 2009/0295182 | A1 | * | 12/2009 | Segeren et al. | 296/26.11 |
| 2010/0001029 | A1 | * | 1/2010 | Tai | 224/499 |
| 2011/0024473 | A1 | * | 2/2011 | Weiss | 224/500 |

* cited by examiner

*Primary Examiner* — Lori Lyjak
(74) *Attorney, Agent, or Firm* — Ipaxio S.E.N.C.

(57) ABSTRACT

A hitch attached extension for over sized cargo has a longitudinally extending frame member adapted to be removably attached to a trailer hitch of a motor vehicle. The longitudinally extending frame member including a draw bar located at a distal end adapted to be connected with the trailer hitch, a pivot member adjacent the draw bar forming a pivot axis adapted to allow the longitudinally extending frame member to be pivoted between a horizontal position and a vertical stowing position with respect to the trailer hitch.

12 Claims, 4 Drawing Sheets

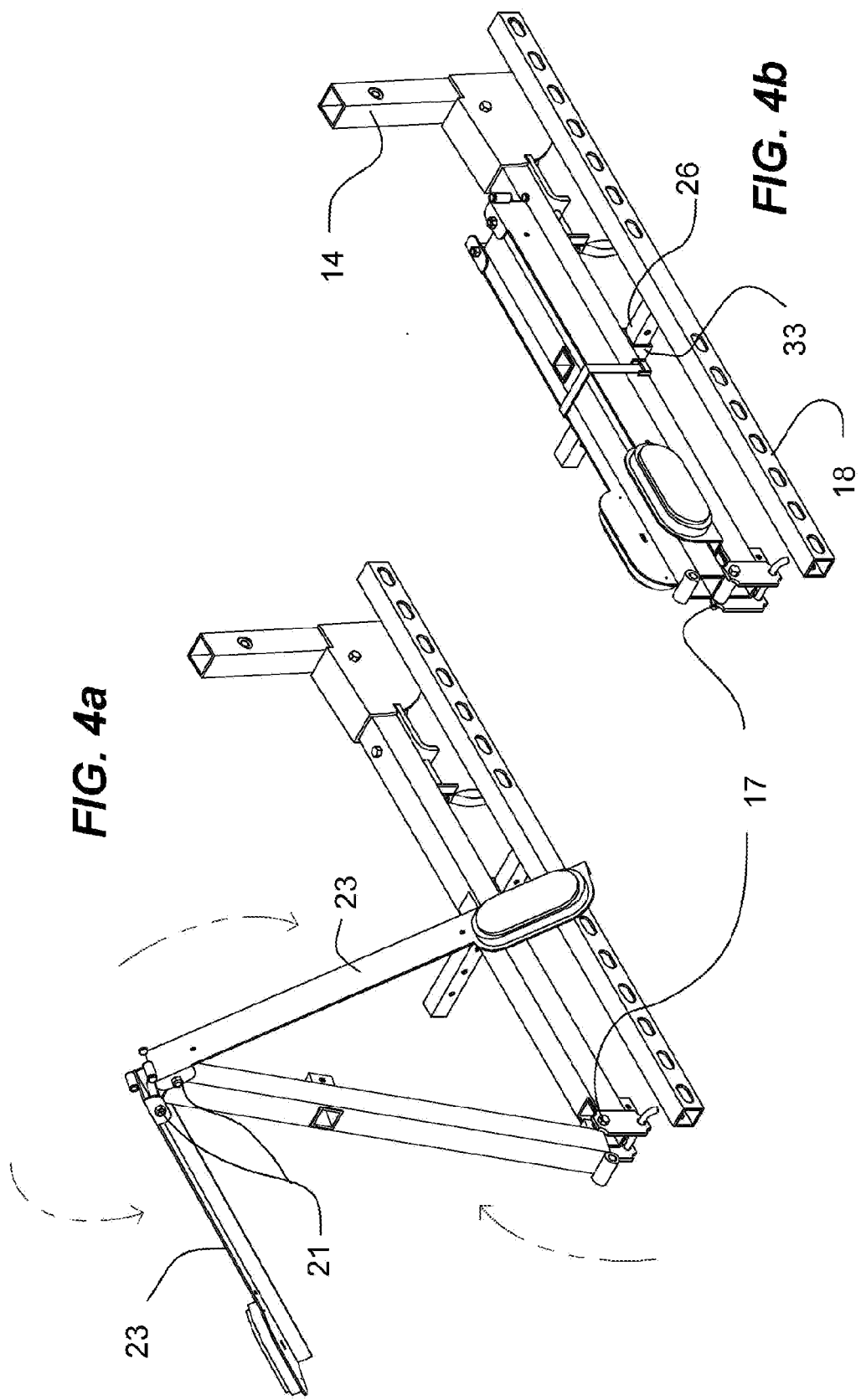

HITCH ATTACHED EXTENSION FOR OVER SIZED CARGO

CROSS-REFERENCE TO PRIOR APPLICATION

This application claims priority based on request GB1002103.8 filed Feb. 9, 2010.

FIELD OF THE INVENTION

The present invention relates generally to hitched devices but more particularly to a device that helps carry and warn others of an oversized cargo load.

BACKGROUND OF THE INVENTION

There exist many types of devices that help carry oversized loads but none offer all of the features of this present invention.

SUMMARY OF THE INVENTION

In view of disadvantages inherent in the known devices now present in the prior art, the present invention, which will be described subsequently in greater detail, is to provide objects and advantages which are to provide a practical, easy to install and safe device to help in carrying oversized loads on cars and other such light vehicles.

In one aspect of the present invention, there is provided a hitch attached extension comprising a first section of a longitudinally extending frame member and a second section of a longitudinally extending frame member adapted to be removably attached to a trailer hitch of a motor vehicle. The first and second sections of the longitudinally extending frame member include a draw bar located at a distal end adapted to be connected with the trailer hitch, a pivot member adjacent the draw bar forming a pivot axis adapted to allow the longitudinally extending frame member to be pivoted between a horizontal position and a vertical stowing position with respect to the trailer hitch, a secondary pivot member to connect the first section and the second section and allow for the unfolding and full extension of the longitudinally extending frame member, a horizontally extending fold out light rack attached to an end of the longitudinally extending frame member opposite from the distal end, and a horizontal support member having a perpendicularly extending peg member extending downwardly from a center point thereof, thereby adapting the horizontal support member to be adjustably connected in a vertical direction, and wherein the horizontal support member further includes a pair of stopper members, each adjustably and removably secured to respective end portions thereof, and adapted to slide along the length thereof, such that the horizontal support member is adapted to be adjusted to the size, shape, and weight of oversized cargo.

The hitch attached extension for oversized cargo has the perpendicular peg member including a series of apertures therethrough, and a pin member adapted to be placed therethrough, such that the perpendicular peg member and the horizontal support member can be easily and removably adjusted vertically with respect to the longitudinally extending frame member.

The hitch attached extension for oversized cargo has the fold out light rack made out of two light rack sections, and each light rack section having a fold out means.

The hitch attached extension for oversized cargo has the horizontal support member releasably inserted through a holding bracket.

The hitch attached extension for oversized cargo has the fold out light rack including a plurality of signal lights attached thereto and connected to electrical wiring.

The hitch attached extension for oversized cargo has the pivot member including at least two apertures and a pin adapted to extend therethrough, such that when the longitudinally extending frame member is in the vertical stowing position, the pin can be placed in the appropriate aperture to hold the longitudinally extending frame member securely in place.

In another aspect, there is provided a combination of a motor vehicle and an extension for pulling oversized cargo, the motor vehicle including a trailer hitch; and the extension comprising a first section of a longitudinally extending frame member and a second section of a longitudinally extending frame member adapted to be removably attached to a trailer hitch of a motor vehicle; the first and second sections of the longitudinally extending frame member including a draw bar located at a distal end adapted to be connected with the trailer hitch, a pivot member adjacent the draw bar forming a pivot axis adapted to allow the longitudinally extending frame member to be pivoted between a horizontal position and a vertical stowing position with respect to the trailer hitch; a secondary pivot member to connect the first section and the second section and allow for the unfolding and full extension of the longitudinally extending frame member; a horizontally extending fold out light rack attached to an end of the longitudinally extending frame member opposite from the distal end, and a horizontal support member having a perpendicularly extending peg member extending downwardly from a center point thereof, thereby adapting the horizontal support member to be adjustably connected in a vertical direction; and wherein the horizontal support member further includes a pair of stopper members, each adjustably and removably secured to respective end portions thereof, and adapted to slide along the length thereof, such that the horizontal support member is adapted to be adjusted to the size, shape, and weight of oversized cargo.

For a better understanding of the invention, its operating advantages and the specific objects attained by its uses, reference should be made to the accompanying drawings and detailed description which contain illustrated preferred embodiments of the invention.

BRIEF DESCRIPTION OF THE DRAWINGS

FIGS. 4a-b are isometric views of the invention partially unfolded and fully folded, respectively.

DETAILED DESCRIPTION OF THE PREFERRED EMBODIMENT

Figure 1:
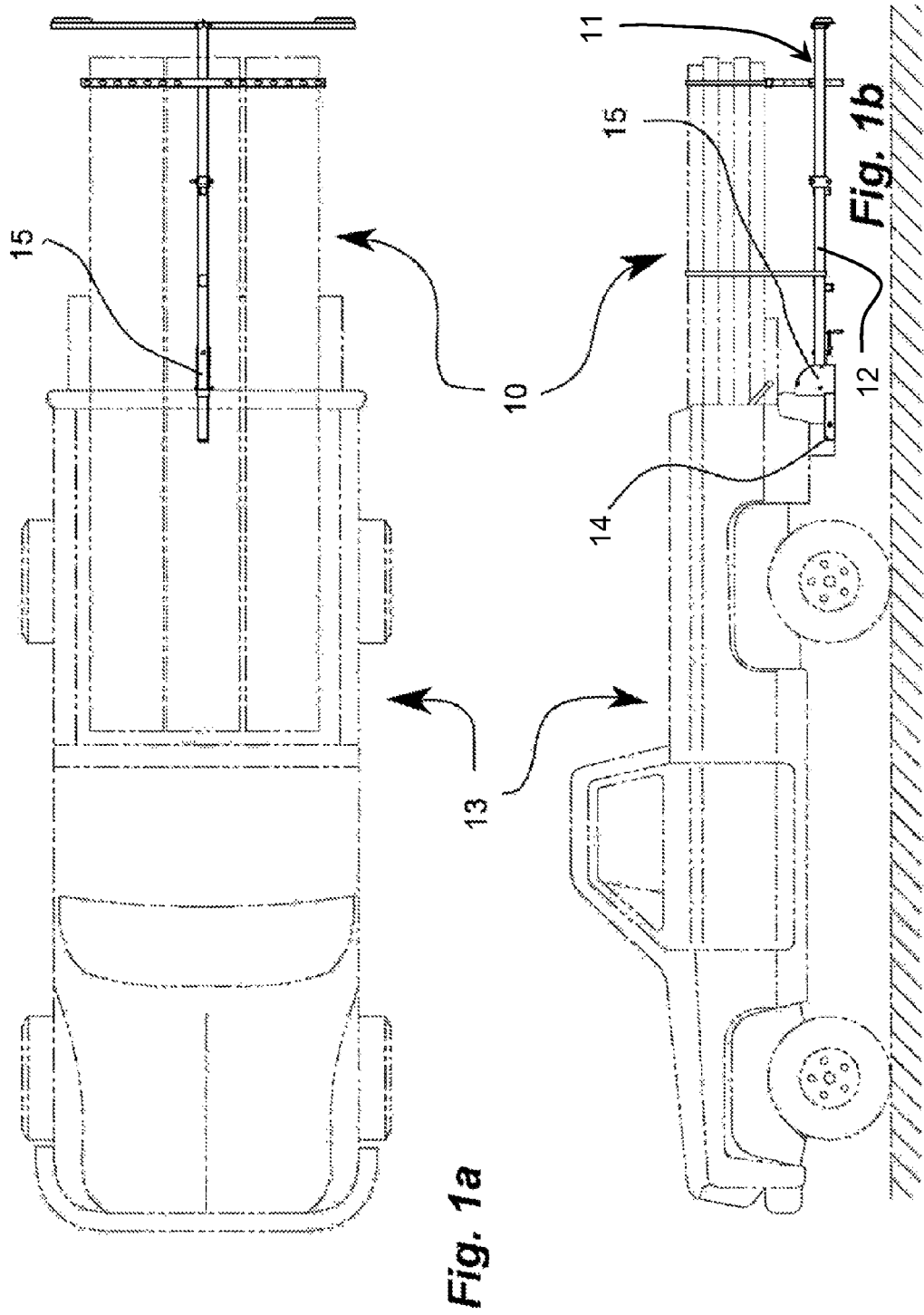
FIGS. 1a-b are top and side views, respectively, of the invention in context.
Figure 2:
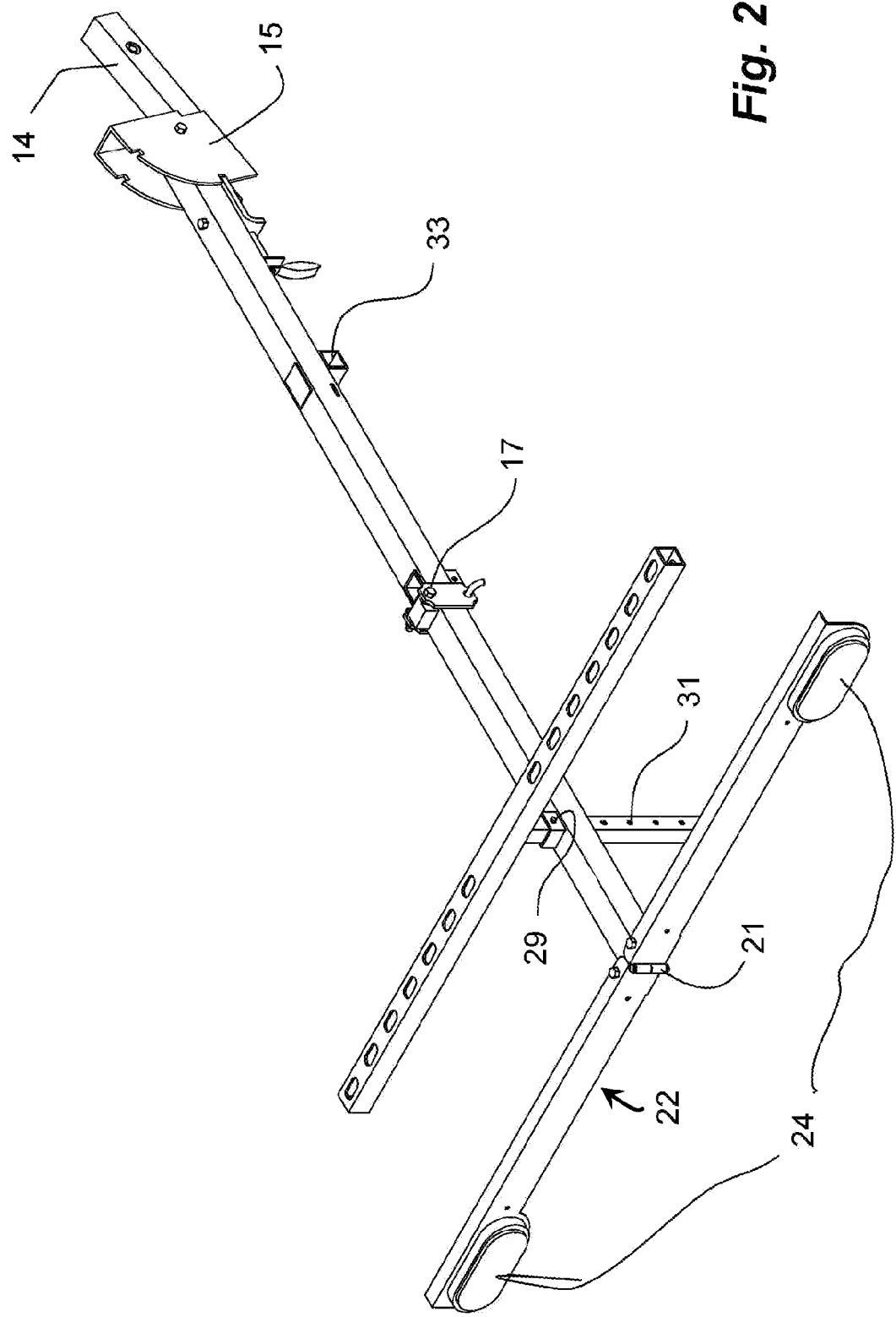
FIG. 2 is an isometric view of the invention.
Figures 3A, 3B, 3C:
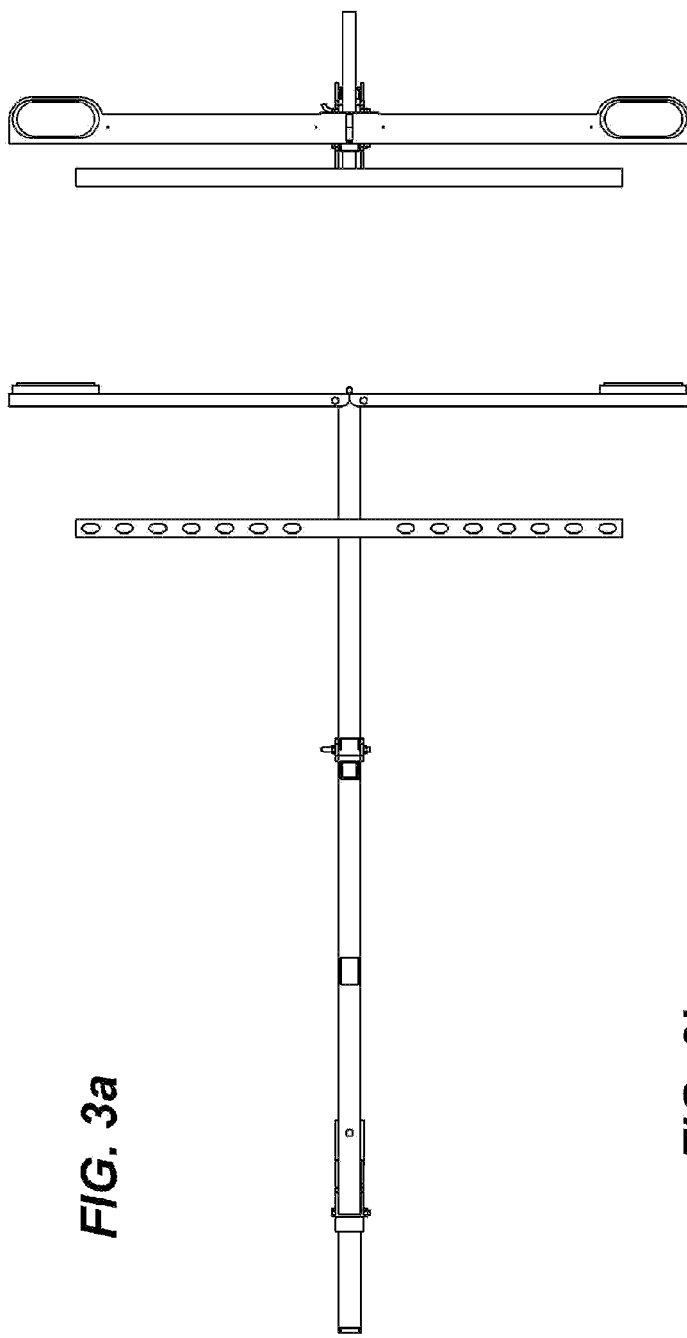
FIGS. 3a-c are top, side and rear views, respectively, of the invention.

The appended figures show a hitch attached extension (11) for oversized cargo (10) hitched to a vehicle such as a pickup truck (13), for example. The hitch attached extension (11) has a draw bar (14) and a longitudinally extending frame member (12). The longitudinally extending frame member (12) includes a first section and a second section.

The hitch attached extension (11) can be lifted vertically when not in use, as seen in FIG. 4b, by rotating around a pivot member (15). The pivot member (15) includes at least two apertures (34) and a latch member (36) adapted to extend therethrough, such that when the first section of the longitudinally extending frame member (12) is in the vertical stowing position, the latch member (36) can be placed in the appropriate aperture (34) to hold the longitudinally extending frame member (12) securely in place. A secondary pivot member (17) allows unfolding the second section of the longitudinally frame member (12) and full extension of the hitch attached extension (11). A simple pin locks the secondary pivot member (17), as is known in the art.

A fold out light rack (22) is where are located all tail and signal lights (24). The fold out light rack (22) is made out of two light rack sections (23), each having a hinge (21) as the fold out means.

At least one horizontal support member (18) is releasably attached to the longitudinally extending frame member (12) and can be adjusted in one of two ways: height, and width, according to the requirements of the load. The height is adjusted by how deep a perpendicular peg member (26) is inserted into an aperture (31) and locked in place by a pin member (29) adapted to be placed therethrough, such that the perpendicular peg member (26) and the horizontal support member (18) can be easily and removably adjusted vertically with respect to the longitudinally extending frame member (12). The width is adjusted by positioning a pair of stopper members along the horizontal support member (18) by inserting the stopper member into one of the plurality of apertures (31) located along the length of the horizontal support member (18). When the hitch attached extension (11) is in a stowaway mode, as shown in FIG. 4b, for example, the horizontal support member (18) is releasably inserted through a holding bracket (33).

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent to those illustrated in the drawings and described in the specification are intended to be encompassed by the present invention.

Therefore, the foregoing is considered as illustrative only of the principles of the invention. Since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A hitch attached extension for oversized cargo, said extension comprising a first section of a longitudinally extending frame member and a second section of a longitudinally extending frame member adapted to be removably attached to a trailer hitch of a motor vehicle; said first and second sections of said longitudinally extending frame member including a draw bar located at a distal end adapted to be connected with said trailer hitch, a pivot member adjacent said draw bar forming a pivot axis adapted to allow said longitudinally extending frame member to be pivoted between a horizontal position and a vertical stowing position with respect to said trailer hitch; a secondary pivot member to connect said first section and said second section and allow for the unfolding and full extension of said longitudinally extending frame member; a horizontally extending fold out light rack attached to an end of said longitudinally extending frame member opposite from said distal end, and a horizontal support member having a perpendicularly extending peg member extending downwardly from a center point thereof, thereby adapting said horizontal support member to be adjustably connected in a vertical direction; and wherein said horizontal support member further includes a pair of stopper members, each adjustably and removably secured to respective end portions thereof, and adapted to slide along the length thereof, such that said horizontal support member is adapted to be adjusted to the size, shape, and weight of oversized cargo.

2. The hitch attached extension for oversized cargo of claim 1, wherein said perpendicular peg member includes a series of apertures therethrough, and a pin member adapted to be placed therethrough, such that said perpendicular peg member and said horizontal support member can be easily and removably adjusted vertically with respect to said longitudinally extending frame member.

3. The hitch attached extension for oversized cargo of claim 1, wherein said fold out light rack is made out of two light rack sections, and each said light rack section having a fold out means.

4. The hitch attached extension for oversized cargo of claim 1, wherein said horizontal support member is releasably inserted through a holding bracket.

5. The hitch attached extension for oversized cargo of claim 1, wherein said fold out light rack includes a plurality of signal lights attached thereto.

6. The hitch attached extension for oversized cargo of claim 1, wherein said pivot member includes at least two apertures and a pin adapted to extend therethrough, such that when said longitudinally extending frame member is in said vertical stowing position said pin can be placed in the appropriate aperture to hold said longitudinally extending frame member securely in place.

7. A combination of a motor vehicle and an extension for pulling oversized cargo, said motor vehicle including a trailer hitch; and said extension comprising a first section of a longitudinally extending frame member and a second section of a longitudinally extending frame member adapted to be removably attached to a trailer hitch of a motor vehicle; said first and second sections of said longitudinally extending frame member including a draw bar located at a distal end adapted to be connected with said trailer hitch, a pivot member adjacent said draw bar forming a pivot axis adapted to allow said longitudinally extending frame member to be pivoted between a horizontal position and a vertical stowing position with respect to said trailer hitch; a secondary pivot member to connect said first section and said second section and allow for the unfolding and full extension of said longitudinally extending frame member; a horizontally extending fold out light rack attached to an end of said longitudinally extending frame member opposite from said distal end, and a horizontal support member having a perpendicularly extending peg member extending downwardly from a center point thereof, thereby adapting said horizontal support member to be adjustably connected in a vertical direction; and wherein said horizontal support member further includes a pair of stopper members, each adjustably and removably secured to respective end portions thereof, and adapted to slide along the length thereof, such that said horizontal support member is adapted to be adjusted to the size, shape, and weight of oversized cargo.

8. The hitch attached extension for oversized cargo of claim 7, wherein said perpendicular peg member includes a series of apertures therethrough, and a pin member adapted to be placed therethrough, such that said perpendicular peg member and said horizontal support member can be easily and removably adjusted vertically with respect to said longitudinally extending frame member.

9. The hitch attached extension for oversized cargo of claim 7, wherein said fold out light rack is made out of two light rack sections, and each said light rack section having a fold out means.

10. The hitch attached extension for oversized cargo of claim 7, wherein said horizontal support member is releasably inserted through a holding bracket.

11. The hitch attached extension for oversized cargo of claim 7, wherein said fold out light rack includes a plurality of signal lights attached thereto.

12. The hitch attached extension for oversized cargo of claim 7, wherein said pivot member includes at least two apertures and a pin adapted to extend therethrough, such that when said longitudinally extending frame member is in said vertical stowing position said pin can be placed in the appropriate aperture to hold said longitudinally extending frame member securely in place.

* * * * *